(12) United States Patent
Kuster et al.

(10) Patent No.: US 6,574,992 B1
(45) Date of Patent: Jun. 10, 2003

(54) METHOD AND DEVICE FOR CURVING AND TEMPERING A GLASS SHEET

(75) Inventors: Hans-Werner Kuster, Aachen (DE);
Werner Diederen, Herzogenrath (DE);
Knut Dahlhoff, Aachen (DE);
Karl-Josef Ollfisch, SW Kerkrade (NL); Wilfried Korsten, Heinsberg (DE)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 09/509,550

(22) PCT Filed: Oct. 22, 1998

(86) PCT No.: PCT/FR98/02256
§ 371 (c)(1),
(2), (4) Date: Nov. 20, 2000

(87) PCT Pub. No.: WO99/20575
PCT Pub. Date: Apr. 29, 1999

(30) Foreign Application Priority Data

Oct. 22, 1997 (DE) .......................................... 197 46 558

(51) Int. Cl.[7] ............................................. C03B 27/044
(52) U.S. Cl. .............................. 65/104; 65/95; 65/114; 65/115; 65/288; 65/286; 65/348; 65/351; 65/374.13; 425/446
(58) Field of Search ............................ 65/95, 114, 115, 65/104, 288, 286, 348, 351, 374.13; 425/446

(56) References Cited

U.S. PATENT DOCUMENTS

| | | | | |
|---|---|---|---|---|
| 3,418,098 A | * | 12/1968 | Kirkman | 65/288 |
| 3,741,743 A | * | 6/1973 | Seymour | 65/288 |
| 4,233,049 A | | 11/1980 | Seymour | |
| 4,280,828 A | | 7/1981 | Seymour | |
| 4,298,368 A | | 11/1981 | Seymour | |
| 4,357,156 A | | 11/1982 | Seymour | |
| 4,661,142 A | * | 4/1987 | Bartusel et al. | 65/348 |
| 4,889,548 A | * | 12/1989 | Kriegesmann et al. | 65/374.13 |
| 5,118,335 A | | 6/1992 | Claassen et al. | |
| 5,139,552 A | * | 8/1992 | Yoshizawa et al. | 65/351 |
| 5,383,950 A | * | 1/1995 | Hashemi et al. | 65/288 |
| 5,385,786 A | * | 1/1995 | Shetterly et al. | 65/115 |
| 5,472,470 A | * | 12/1995 | Kormanyos et al. | 65/348 |
| 5,679,124 A | * | 10/1997 | Schnabel, Jr. et al. | 65/288 |

FOREIGN PATENT DOCUMENTS

| | | |
|---|---|---|
| EP | 0 005 306 | 11/1979 |
| EP | 0 400 631 | 12/1990 |

* cited by examiner

*Primary Examiner*—Michael Colaianni
(74) *Attorney, Agent, or Firm*—Oblon, Spivak, McClelland, Maier & Neustadt, P.C.

(57) ABSTRACT

During a process for bending and quenching a window pane, the latter is bent to the desired shape using a forming frame. Next, by means of this same forming frame, the entire surface of both sides of the bent window pane is rapidly cooled, in a quenching station which follows the bending station, by blowing cold air using blowing boxes provided with blowing nozzles. While the entire surface is being rapidly cooled, the edge regions of the window pane which rest on the forming frame are subjected to a blast of additional cold air by the suitable supply of compressed air to the openings passing through the forming frame.

28 Claims, 4 Drawing Sheets

METHOD AND DEVICE FOR CURVING AND TEMPERING A GLASS SHEET

BACKGROUND OF THE INVENTION

The present invention relates to a process for bending and quenching a window pane, in which the window pane heated to the bending temperature is bent to the desired shape in a horizontal position using a forming frame and the entire surface of both sides of the bent window pane is then rapidly cooled on the forming frame, in a quenching station which follows the bending station, by blowing cold air using blowing boxes provided with blowing nozzles. The invention also relates to the devices that are needed for carrying out this process.

Processes of this kind are known in various forms. In one such process, disclosed by document DE 2,945,776 C2, the flat window pane to be bent is lifted up using a plate with suckers and is put down on the bending former placed vertically beneath the window pane, the window pane taking the shape of the bending former due to the effect of the kinetic energy of the drop. The bent window pane is brought to the quenching station with this forming frame.

In the process called press bending, like that revealed for example in document EP 0,005,306 B1, the forming frame acts as a press bending former by means of which the window pane is pressed against an upper bending former, the entire surface of which is convex. Next, the bent window pane is brought to the quenching station with this forming frame and is rapidly cooled on it.

The forming frames which are used as support frames for the window panes during the quenching operation must be configured so as not to impede the essential rapid cooling of the edge region of the window pane. This is why they are provided, on their support surfaces, with protuberances, flow channels or recesses so that the blown air directed onto the lower face of the window pane also reaches the edge region of the window pane and brings about the rapid cooling needed for producing the required quench. The forming frames for supporting the window pane during the quench are described, for example, in U.S. Pat. No. 5,118,335 and EP-B-0,186,529.

It has proved to be the case that known processes of the abovementioned type, in which the window panes are bent by means of one and the same forming frame and are quenched while resting on this forming frame, did not always allow satisfactory results to be obtained. Depending on the construction of the forming frame, it may happen, for example, that the window pane quenching which can be achieved in the edge region is too low or that, when sufficient quenching is achieved, the bending operation is the cause of optically undesirable deformations in the edges of the window pane. The optically undesirable deformations mainly arise from the protuberances or recesses in the surfaces for supporting the forming frames which are necessary for the blown air to circulate and because of which the edges of the window pane are subjected to unequal stresses. These unequal stresses are particularly apparent and undesirable when the window panes have to be heated relatively strongly in order to obtain a pronounced curvature and/or when the edges of the window pane are provided with an opaque decorative frame of paint to be cured, so that, because of the increased reflection, these deformations, which are minute in themselves, become particularly apparent. The optically undesirable deformations of this kind are especially noticeable when the window panes are fitted without a frame into the body of the motor vehicle since the edge region of the window pane is then visible right up to the actual edge, at which point the aforementioned deformations are naturally the greatest.

The optically undesirable deformations could of course be avoided, or at the very least greatly reduced, if the surface for supporting the window pane on the forming frame were increased, for example by widening the supporting protuberances and/or by reducing the distance between the supporting protuberances. However, the problem then arises again that the amount of blown air reaching the edge region of the window pane is insufficient, so that the necessary degrees of quenching are not achieved.

SUMMARY OF THE INVENTION

The object of the invention is to improve the process of the type described in the preamble so that it allows both manufacture of bent window panes whose edges are free of optically undesirable deformations and allows irreproachable quenching of the bent window panes in their edge region.

According to the invention, this object is achieved in that, while the entire surface of the window pane is being rapidly cooled, the edge regions of the window pane that are covered by the forming frame are subjected to additional blowing of cold air by the suitable supply, to the openings passing through the forming frame, of compressed air at a greater pressure than the ambient pressure which prevails between the blowing boxes.

The suitable supply of additional cold air, at an increased pressure, at the covered edge regions of the window vane, through the forming frame, makes it possible to design the bearing surface of the forming frame in such a way that it no longer produces deformations of the edge of the window pane because of the unequal action of the mechanical deformation forces. In particular, the wide flow channels in the forming frame may be omitted and, instead of them, the forming frame may be provided with holes of relatively small diameter or may be made of a porous material. The compressed air is then supplied to the lower face of the forming frame via a circular delivery channel, simply taking care to ensure that the openings in the forming frame, on the one hand, and the volume flow and pressure of the compressed air, on the other hand, are mutually adapted in such a way that the necessary cooling effect in the regions covered by the forming frame is achieved.

BRIEF DESCRIPTION OF THE DRAWINGS

Other features and advantages of the process according to the invention will emerge from the dependent claims and from the description which is given below of a preferred embodiment example of a forming frame suitable for the process according to the invention and with reference to the drawings.

In the drawings.

DESCRIPTION OF THE PREFERRED EMBODIMENTS

Figure 1:
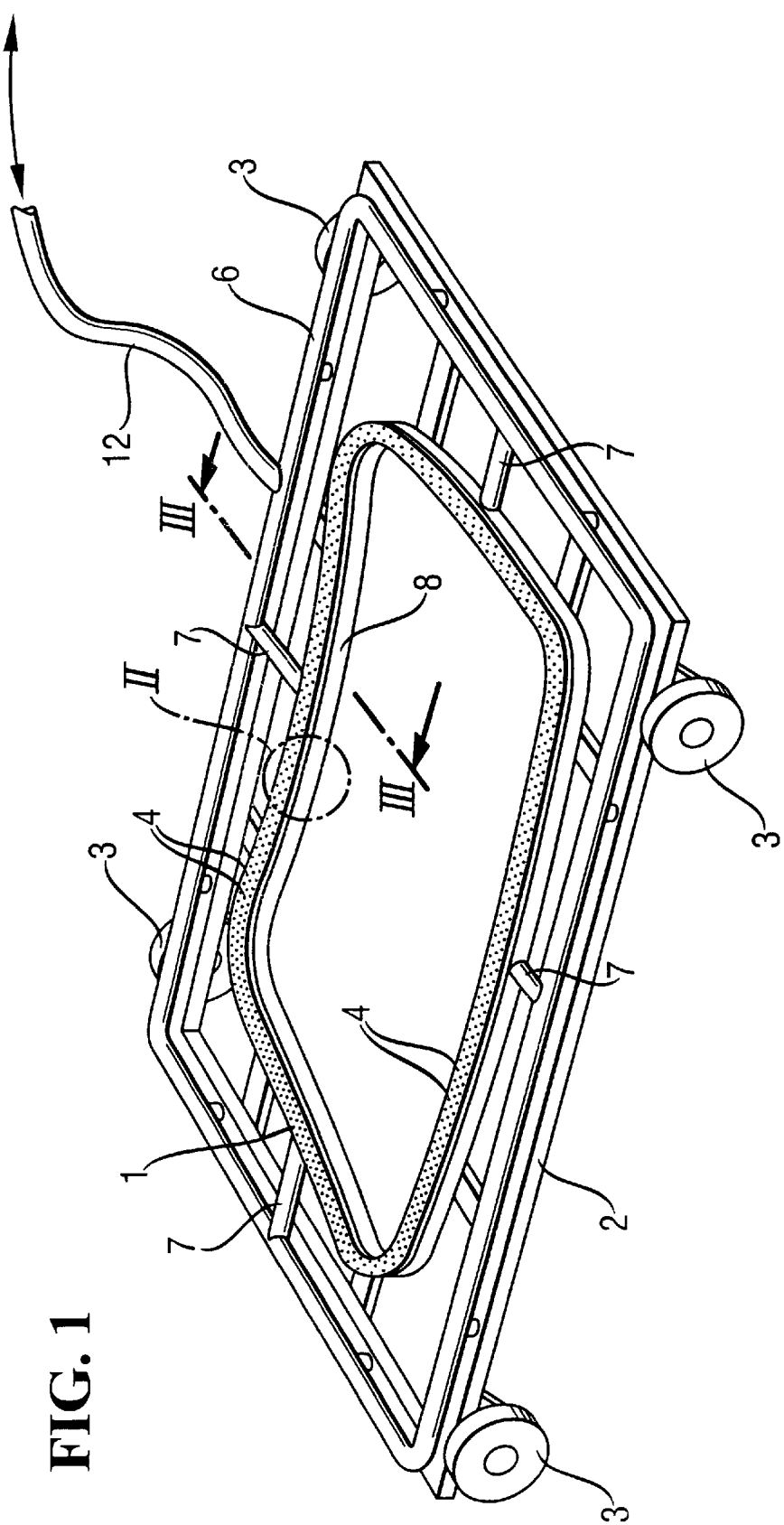
FIG. 1 is a perspective view of a forming frame according to the invention.

As shown in FIG. 1, the forming frame 1 is mounted on a carriage 2 which can be moved on rails by means of wheels 3 into a bending and quenching plant. As may also be observed in FIG. 2, the forming frame 1 is a frame pierced by holes 4 intended for the suitable supply of compressed air. The holes 4 must have a diameter d and a spacing a between them which are such that a window pane 5 heated to the softening temperature cannot deform either under its own weight or by the forces which are exerted on it during a pressing operation. Depending on the thickness of the windowframe to be bent and quenched, the diameter d of the holes 4 is, for example, from 1 to 10 mm and the spacing a between the holes 4 is, for example, from 2 to 20 mm.

In the embodiment example of the forming frame shown, by means of which a window pane with a thickness of 3 mm has to be bent and quenched, the holes 4 have a diameter of 2 mm and are arranged in three rows based in a staggered fashion along the perimeter of the forming frame 1. The centres of the holes 4 in each row are 6 mm apart and the rows themselves are also 6 mm apart.

Outside the forming frame 1, a circular pipe 6 is mounted on the carriage 2, this pipe being connected at several places to a delivery channel 8 by means of connecting ducts 7. In the example illustrated, the delivery channel 8 lies directly beneath the forming frame 1 and is joined it to by welding. The circular pipe 6 is connected to a compressed-air line, not shown, by means of a hose 12 made of a material resistant to high temperatures.

The forming frame 1 serves as a bending former and a transportation frame for bringing the bent window pane to the quenching station and as a frame for supporting the window pane during the quenching operation. In the case of press bending a window pane, for example, the window pane heated to the bending temperature is firstly taken on a roller transporter into a bending oven beneath a convex bending former, is positioned beneath the convex bending former and lifted up by a flow of hot gas directed upwards against the window pane and is pressed against the convex bending former. Next, the carriage 2 with the forming frame 1 is brought to a position lying vertically below the bending former against which the window pane is held in place by the flow of upwardly blown hot gas.

As soon as the forming frame is in the hot zone of the furnace, the hose 12 is connected to a vacuum line so that the ambient hot air is sucked out through the surface for bearing the forming frame. The purpose of this operation is to heat the surface of the forming frame to a suitable temperature so that contact with the hot window pane does not cause a damaging heat shock. Next, while still maintaining the flow of upwardly blown hot gas, the upper bending former and the window pane are lowered onto the forming frame 1 so that the window pane, by means of the forming frame 1, is pressed to the desired shape. Next, the windowframe is deposited on the forming frame 1 by stopping the flow of hot gas. The upper convex bending former is raised and the carriage 2, with the forming frame 1 and the window pane resting on the latter, are then taken to the quenching station between two blowing boxes by means of which the window pane is rapidly cooled.

While the window pane 5 is undergoing air quenching by means of conventional blowing boxes, the surface regions of the window pane 5 that are covered by the forming frame 1 are rapidly cooled by compressed air supplied to the delivery channel 8 via the circular pipe 6. The compressed air leaving the delivery channel 8 is directed by the holes 4 onto the covered regions of the windowframe 5 and subjects these regions to rapid cooling. In order to achieve a correct quench in the edge region of the windowframe 5, a pressure of, for example, 4 bar of the compressed air supplied has proved to be sufficient.

Figure 2:
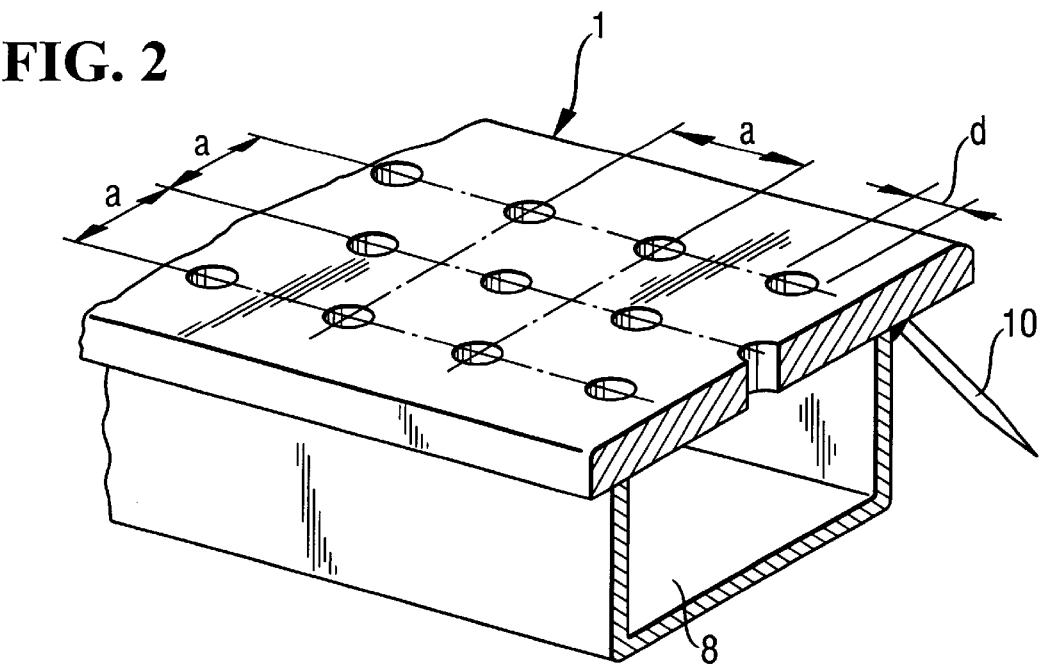
FIG. 2 illustrates a portion (region II) of FIG. 1 on a larger scale.
Figure 3:
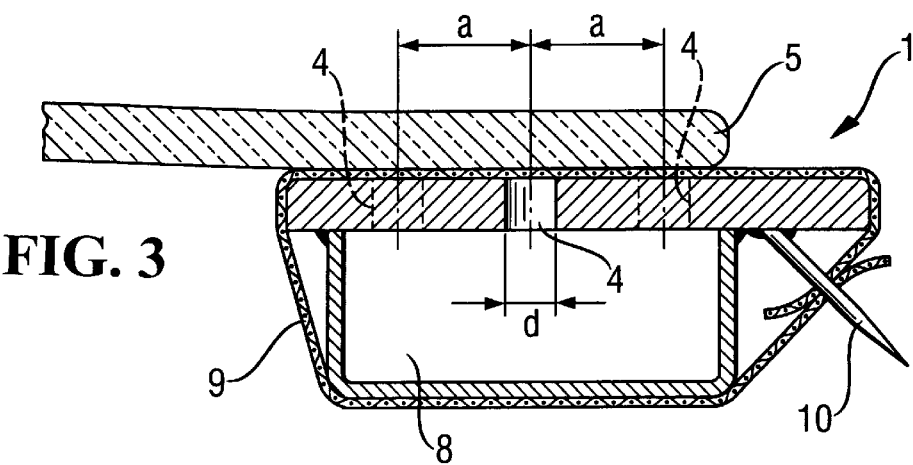
FIG. 3 is a sectional view on the line III—III in FIG. 1.

As regards the rest, the forming frame 1 is covered in a known manner with a mesh of gas-permeable metal fibres 9 which is fixed to pointed pins 10, as may be seen in FIG. 2 and FIG. 3.

In order to ensure that the forming frame is thermally insulated from the delivery channel 8, the laster may be fitted 0.5 to 3 mm away from it. This thermal insulation then allows the forming frame to be heated more rapidly and cooled more rapidly. This may be advantageous, for example when the cycle time of a bending and quenching plant is relatively short.

Figure 4:
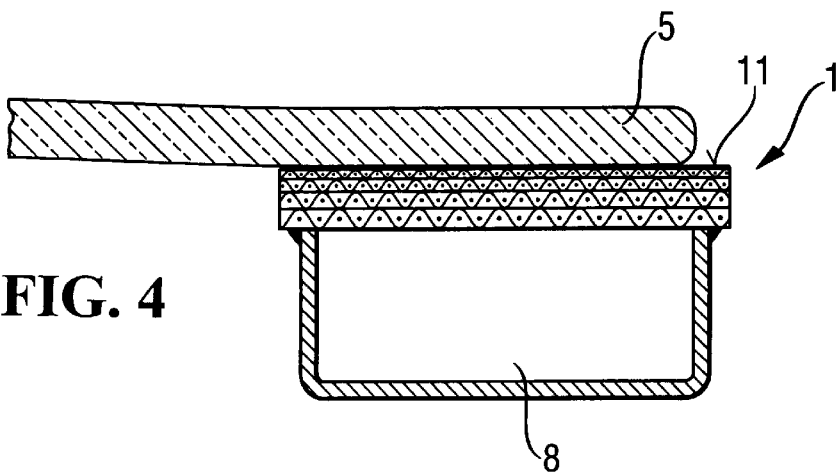
FIG. 4 shows another embodiment of a forming frame in a sectional view on the line III—III in FIG. 1.
Figure 5:
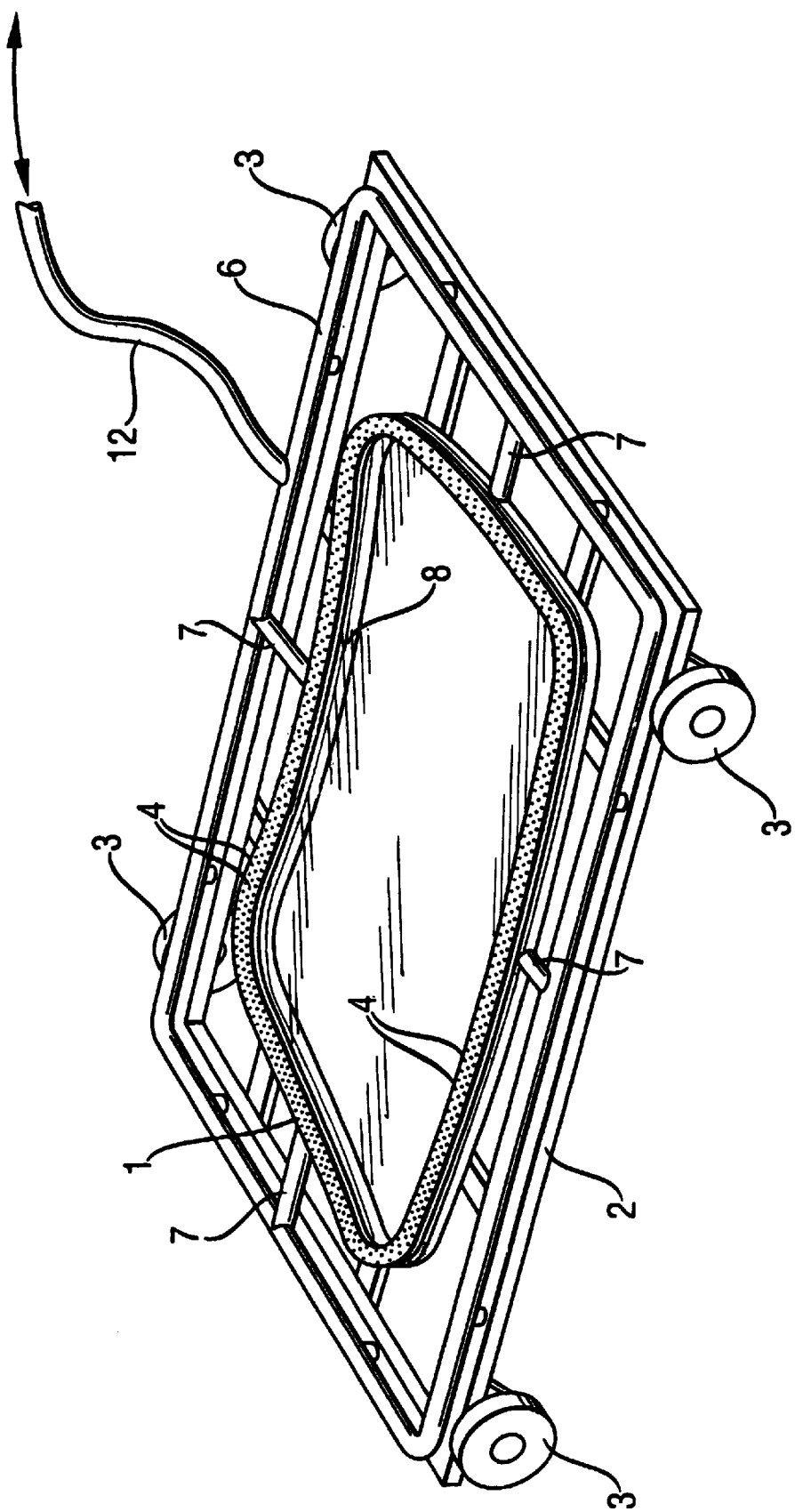
FIG. 5 illustrates the convex bending former in the press molding operation.
Figure 6:
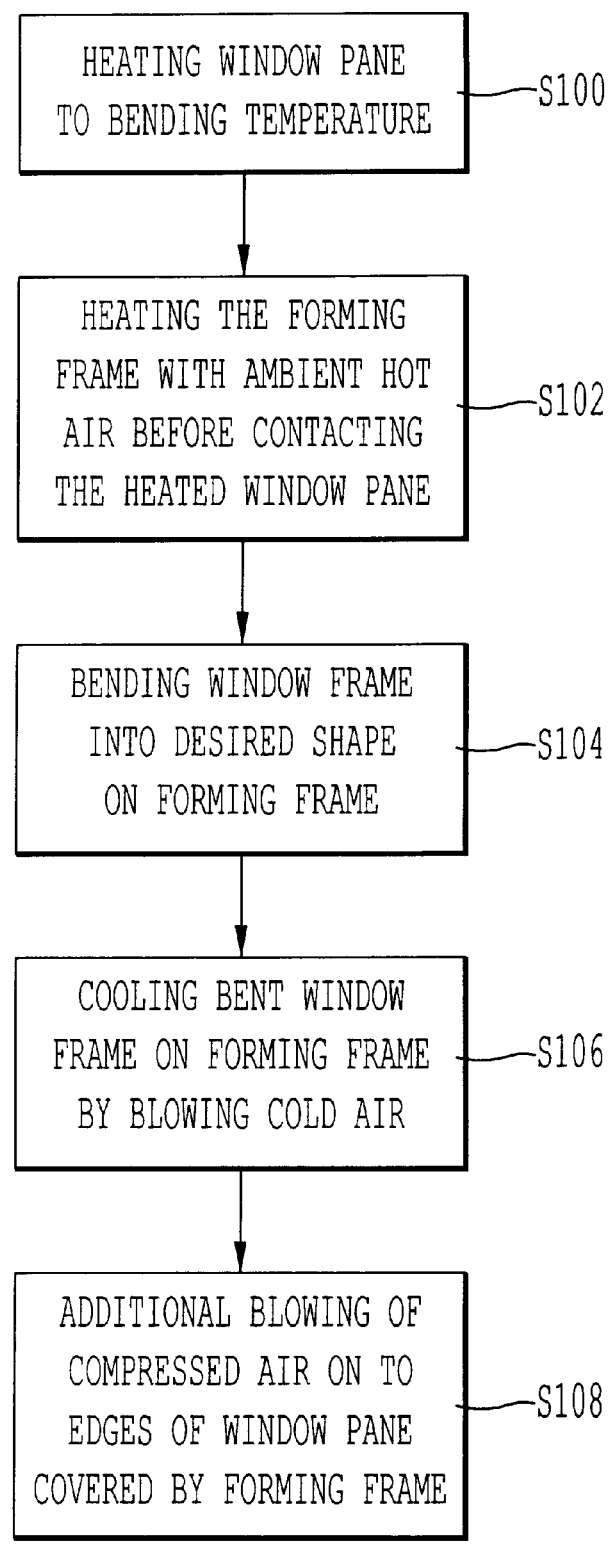
FIG. 6 illustrates a schematic of the process.

FIG. 4 shows another embodiment of the forming frame 1. Although the delivery channel 8 is made in the same way as in the previous example, the forming frame 1 is composed of composite panels of wire gauze, these being available on the market, for example, under the trademark "Haver Porostar®". The composite panels of wire gauze of this kind are formed from a number of thicknesses of steel wire gauze resistant to high temperatures and are solidly joined together by sintering. Since the individual pieces of wire gauze are selected depending on the gauge of the wires, the spacing of the wires and the shape of the interstices allow the properties of the composite panels, such as the gas permeability, the porosity, the distribution of pores and the nature of the surface, to be precisely determined. That surface facing the window pane 5 must be as smooth as possible, that is to say formed from a wire gauze in which the wires are as fine as possible and the width of the interstices is small. On the other hand, the wire gauze thicknesses of the underlying layers may usefully have increasingly wide interstices. The gas permeability is chosen such that the interstices form the holes in the forming frame, via which holes the surface regions of the window pane 5 that are covered by the forming frame undergo additional cooling because of the supply of compressed air and the hot ambient air is sucked out for the purpose of heating the forming frame 1.

In order to have better thermal insulation, the surface of the forming frame which comes into contact with the window pane 5 may include a 0.2 to 1 mm thick ceramic coating 11 which is known per se. The ceramic coating 11 is preferably composed of zirconium dioxide. It may be advantageous first of all to deposit a tie layer on the surface of the forming frame. A tie layer of this kind may, for example, consist of a nickel-aluminium alloy or a nickel-chromium-aluminium alloy. Both the tie layer and the ceramic coating are advantageously applied using the plasma spraying or flame metallizing process. During the coating process, it is necessary to ensure that the gas permeability of the forming frame 1 is maintained. This may be achieved by carrying out the coating operation on the finished forming frame, pressurized air being simultaneously injected into the delivery channel and leaving via the holes in the surface of the forming frame, thus preventing these holes from becoming obstructed during the coating operation.

What is claimed is:

1. Process for bending and quenching a window pane, in which the window pane heated to the bending temperature is bent into the desired shape in a horizontal position using a forming frame and the entire surface of both sides of the bent window pane is then rapidly cooled on this forming frame, in a quenching station which follows the bending station, by blowing cold air using blowing boxes provided with blowing nozzles, characterized in that, while the entire surface of the window pane is being rapidly cooled, the edge regions of the window pane that are in contact with the forming frame are subjected to additional blowing of cold air by a suitable supply only from below, to openings passing through the forming frame, of compressed air at a pressure greater than ambient pressure which prevails between the blowing boxes.

2. Process according to claim 1, characterized in that the forming frame is heated by ambient hot air being sucked out through the openings with which it is pierced before coming into contact with the window pane heated to the bending temperature.

3. Forming frame for use for bending and quenching a window pane, in which the window pane heated to the bending temperature is bent into the desired shape in a horizontal position using a forming frame and the entire surface of both sides of the bent window pane is then rapidly cooled on this forming frame, in a quenching station which follows the bending station, by blowing cold air using blowing boxes provided with blowing nozzles, characterized in that, while the entire surface of the window pane is being rapidly cooled, the edge regions of the window pane that are in contact with the forming frame are subjected to additional blowing of cold air by a suitable supply only from below, to openings passing through the forming frame, of compressed air at a pressure greater than ambient pressure which prevails between the blowing boxes, wherein the forming frame is further characterized by a delivery channel which can be connected to a pressurized-gas line or to a vacuum line, is fitted along at least part of the perimeter of the forming frame and in that said openings lead, from the delivery channel, through the forming frame to the surface of the forming frame on which the window pane is borne.

4. Forming frame according to claim 3, characterized in that the delivery channel lies beneath the forming frame.

5. Forming frame according to claim 3, characterized in that the delivery channel, seen in the radial direction, lies outside the forming frame.

6. Forming frame according to claim 3, characterized in that the delivery channel, which rests directly against the forming frame, is connected to the forming frame.

7. Forming frame according to claim 3, characterized in that the delivery channel lies at a distance of 0.5 to 3 mm from the forming frame in order for it to be thermally insulated from the forming frame.

8. Forming frame according to claim 3, characterized in that the forming frame consists of a metal plate pierced with openings.

9. Forming frame according to claim 3, characterized in that the forming frame consists of a composite material formed from pieces of gas-permeable wire gauze.

10. Forming frame according to claim 9, characterized in that the composite material making up the forming frame is composed of several superimposed pieces of wire gauze which are joined together by sintering and have interstices of various widths, the upper layer consisting of a very fine mesh gauze.

11. Forming frame according to claim 3, characterized in that the surface of the forming frame on which the window pane bears is covered with a meshed, woven or felted texture of metal fibres which is resistant to high temperatures and is gas-permeable, the individual fibres of which have a diameter of 5 to 1 micrometers.

12. Forming frame according to claim 3, characterized in that the surface of the forming frame which bears the window pane is covered with a ceramic coating that includes at least one of aluminium oxynitride, silicon-aluminium oxynitride, aluminium titanate and zirconium dioxide.

13. Forming frame for use for bending and quenching a window pane, in which the window pane heated to the bending temperature is bent into the desired shape in a horizontal position using a forming frame and the entire surface of both sides of the bent window pane is then rapidly cooled on this forming frame, in a quenching station which follows the bending station, by blowing cold air using blowing boxes provided with blowing nozzles, characterized in that, while the entire surface of the window pane is being rapidly cooled, the edge regions of the window pane that are in contact with the forming frame are subjected to additional blowing of cold air by a suitable supply only from below, to openings passing through the forming frame, of compressed air at a pressure greater than ambient pressure which prevails between the blowing boxes, wherein
  the forming frame is heated by ambient hot air being sucked out through the openings with which it is pierced before coming into contact with the window pane heated to the bending temperature, and wherein
  the forming frame is further characterized by a delivery channel which can be connected to a pressurized-gas line or to a vacuum line, is fitted along at least part of the perimeter of the forming frame and in that the openings lead, from the delivery channel through the forming frame to the surface of the forming frame on which the window pane is borne.

14. Forming frame according to claim 13, characterized in that the delivery channel lies beneath the forming frame.

15. Forming frame according to claim 13, characterized in that the delivery channel, seen in the radial direction, lies outside the forming frame.

16. Forming frame according to claim 13, characterized in that the delivery channel, which rests directly against the forming frame, is connected to the forming frame.

17. Forming frame according to claim 13, characterized in that the delivery channel lies at a distance of 0.5 to 3 mm from the forming frame in order for the delivery channel to be thermally insulated from the forming frame.

18. Forming frame according to claim 13, characterized in that the forming frame consists of a metal plate pierced with openings.

19. Forming frame according to claim 13, characterized in that the forming frame consists of a composite material formed from pieces of gas-permeable wire gauze.

20. Forming frame according to claim 19, characterized in that the composite material making up the forming frame is composed of several superimposed pieces of wire gauze which are joined together by sintering and have interstices of various widths, the upper layer consisting of a very fine mesh gauze.

21. Forming frame according to claim 13, characterized in that the surface of the forming frame on which the window pane bears is covered with a meshed, woven or felted texture of metal fibres which is resistant to high temperatures and is gas-permeable, the individual fibres of which have a diameter of 5 to 1 micrometers.

22. Forming frame according to claim 13, characterized in that the surface of the forming frame which bears the window pane is covered with a ceramic coating of aluminium oxynitride, silicon-aluminium oxynitride, aluminium titanate or zirconium dioxide.

23. Process for bending and quenching a window pane, in which the window pane heated to the bending temperature is bent into the desired shape in a horizontal position using a forming frame and the entire surface of both sides of the bent window pane is then rapidly cooled on this forming frame, in a quenching station which follows the bending station, by blowing cold air using blowing boxes provided with blowing nozzles, characterized in that, while the entire surface of the window pane is being rapidly cooled, the edge regions of the window pane that are in contact with the forming frame are subjected to additional blowing of cold air by a suitable supply only from below, to openings passing through the forming frame, of compressed air at a pressure greater than ambient pressure which prevails between the blowing boxes, wherein the forming frame is heated by ambient hot air being sucked out through the openings with which it is pierced before coming into contact with the window pane heated to the bending temperature.

24. The process for bending and quenching a window pane according to claim 3, wherein the forming frame bends the window pane, the window pane being positioned between a convex bending former and the forming frame, the forming frame being positioned under the convex bending former.

25. The process for bending and quenching a window pane according to claim 13, wherein the forming frame bends the window pane, the window pane being positioned between a convex bending former and the forming frame, the forming frame being positioned under the convex bending former.

26. The process for bending and quenching a window pane according to claim 3, wherein the forming frame transports the window pane from the bending station to the quenching station while the window pane is positioned on the forming frame.

27. The process for bending and quenching a window pane according to claim 13, wherein the forming frame transports the window pane from the bending station to the quenching station while the window pane is positioned on the forming frame.

28. The process according to claim 23, wherein the window pane is positioned between the forming frame and a convex bending former, the forming frame being positioned beneath the convex bending former, and wherein the forming frame transports the window pane to the quenching station after the window pane has been bent between the forming frame and the convex bending former.

* * * * *

UNITED STATES PATENT AND TRADEMARK OFFICE
CERTIFICATE OF CORRECTION

PATENT NO.    : 6,574,992 B1
DATED         : June 10, 2003
INVENTOR(S)   : Kuster Hans-Werner et al.

It is certified that error appears in the above-identified patent and that said Letters Patent is hereby corrected as shown below:

Column 2,
Line 31, change "vane" to -- pane --.
Line 62, remove "and" from line 62.

Column 4,
Line 12, change "laster" to -- latter --

Signed and Sealed this

Fourteenth Day of October, 2003

JAMES E. ROGAN
*Director of the United States Patent and Trademark Office*